No. 648,782. Patented May 1, 1900.
F. W. PATTERSON.
PACKING VESSEL.
(Application filed Dec. 23, 1899.)
(No Model.)
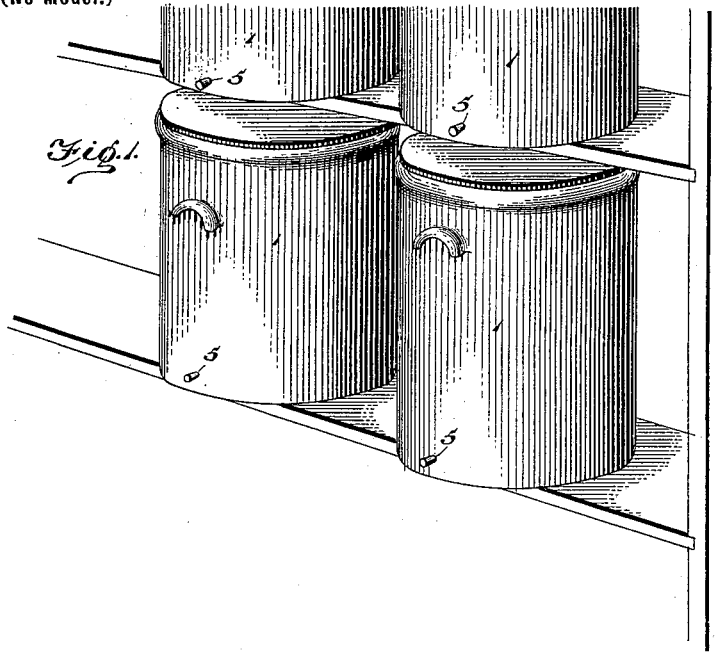
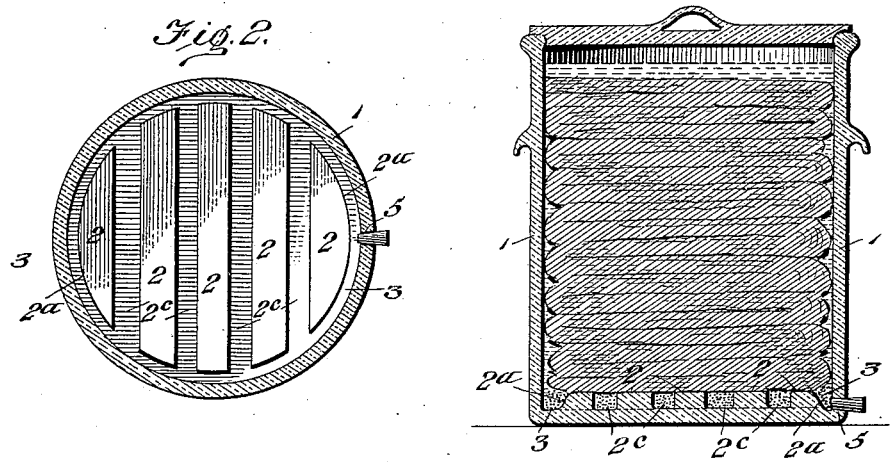
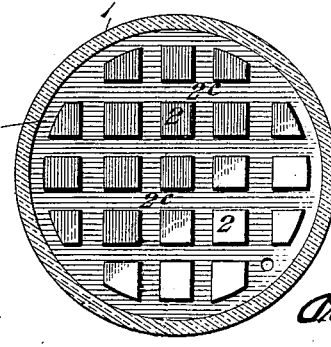
WITNESSES:
H. G. Dieterich
Louis Dieterich
INVENTOR
F. W. Patterson
BY
Fred G. Dieterich & Co.
ATTORNEYS
THE NORRIS PETERS CO., PHOTO-LITHO., WASHINGTON, D. C.

UNITED STATES PATENT OFFICE.

FREDERICK W. PATTERSON, OF NORTH ADAMS, MICHIGAN, ASSIGNOR OF ONE-HALF TO ERNEST W. WERNER, OF SAME PLACE.

PACKING VESSEL.

SPECIFICATION forming part of Letters Patent No. 648,782, dated May 1, 1900.

Application filed December 23, 1899. Serial No. 741,373. (No model.)

*To all whom it may concern:*

Be it known that I, FREDERICK W. PATTERSON, residing at North Adams, in the county of Hillsdale and State of Michigan, have invented a new and Improved Packing Vessel, of which the following is a specification.

This invention is in the nature of an improved crock or jar particularly adapted for packing pork or other meats requiring a brine; and it has for its object to provide a simple and inexpensive packing vessel for the purposes stated having as a characteristic feature a peculiarly-constructed bottom and drawing-off aperture coacting therewith, whereby the briny fluid can be quickly and effectively drawn from the crock without any unnecessary handling of the same or disarranging its contents.

When meats requiring a brine are packed for any length of time—say six months or longer—the brine usually becomes sour, and in consequence thereof must be drawn off and heated. In the old or present style of crock generally employed for packing salted meats the meat must be all taken out of the crock when it is desired to empty the brine and the meat again repacked, thus necessitating considerable labor and time, and besides, by reason of handling and repacking, injuring the quality of the meat.

I am aware crocks or other vessels having a smooth bottom and an escape-outlet have been provided. Such form of packing vessel, however, does not effect all the results desired, as the meat will invariably stop up the escape-outlet and prevent the brine running off.

My invention seeks to overcome the objections above noted and as found in the present style of crocks or other packing vessels; and it consists in a new and improved article involving a certain novel construction and arrangement of parts, which I shall first describe in detail and then specifically point out in the claims, reference being had to the accompanying drawings, in which—

Figure 1 illustrates the manner in which my improved crock can be packed and held during the operation of removing the brine. Fig. 2 is a vertical section of my improved crock, illustrating the manner in which the meat sets upon the bottom. Fig. 3 is a horizontal section of the crock. Fig. 4 is a view of a slightly-modified form of my crock.

In the practical construction the crock has its body 1 made of any desired size and shape, its upper end being suitably formed to receive an ordinary cover or other closure member.

The bottom of the crock is integrally formed with the remainder and has a centrally-raised portion 2, which in a full-sized stone crock extends up, preferably, about one inch from the bottom, the said surface 2 being nearly the entire internal diameter of the vessel and separated from the side walls thereof by an annular channel or groove 3, the peripheral edge of the surface 2 terminating in a taper or beveled toward the groove 3, as indicated at $2^a$, the purpose of which will presently appear.

The surface 2 has a series of parallel channels or depressions $2^c$, which in the full-sized crocks are disposed about one inch apart and extend the full width of the surface 2 and communicate with the annular groove 3, the whole forming, as it were, a central corrugated bottom surrounded by an annular groove or channel-way 3.

It will be noticed by reference to Figs. 2 and 3 that the raised surfaces between the several grooves $2^c$ are made, preferably, flat and all of the surfaces in the same horizontal plane. The object of thus making the surfaces between the grooves $2^c$ is to provide for a solid seat upon which the meat can rest without danger of being squeezed unnecessarily down into the grooves $2^c$, it being obvious that were the raised surfaces rounded or beveled the tendency would be to penetrate the bottom of the meat and cause that portion of the bottom meat exposed over the grooves $2^c$ to press down into the said groove and in a measure retard the proper flow of the brine through the said grooves $2^c$. It will also be noticed by reference to Fig. 2 that by providing a crock or vessel having a bottom as described the meat, while having practically a solid bearing-surface, will be held up from the bottom of the grooves $2^c$ to allow for an uninterrupted circulation of the briny fluid thereunder, which not alone provides for the perfect absorption of the brine with the under surface of the meat than would be possible were the entire bottom surfaces of the meat resting upon a continuous flat bottom, it also providing a collecting-space for the brine from the meat bulk as the brine is being drawn off from the bottom, the flow of the brine into the annular groove 3 being somewhat facilitated from the upper surfaces 2 by beveling the peripheral edges $2^a$ of the said surfaces. Furthermore, corrugating the bottom of the crock as described allows for so placing the drawing-off aperture 5 that it cannot become readily choked up by the meat pressing against it.

The aperture 5 is preferably made upon the side of the crock, as shown in Figs. 1, 2, and 3, in a plane with the bottom of the channel or groove 3, or, if desired, the outlet 5 may be extended through the bottom of the crock, as shown in Fig. 4, it being understood in either case when the crock is filled and set away the outlets will be suitably plugged.

From the foregoing, taken in connection with the drawings, it will be apparent that the brine can be readily drawn off as desired without disturbing either the crock or the meat contained therein.

While I prefer to corrugate the bottom in one direction only, as shown in Fig. 3, it is manifest it may be corrugated in transverse directions. In either case, however, the corrugations are made to discharge toward the groove 3.

My improvements can be embodied in all sizes of stone crocks or other storing vessels in which the contents are held from putrefaction by suitable preserving antiseptic fluids.

Having thus described my invention, what I claim, and desire to secure by Letters Patent, is—

1. As a new article of manufacture, a stone crock or jar, comprising a body portion 1, open at the top, the upper end of the said top being suitably formed to receive a closure member, the said body portion 1, having an integrally-formed bottom, said bottom having a centrally-raised portion 2, said portion 2, having a diameter nearly that of the internal diameter of the body and separated therefrom by a continuously-extending or annular groove 3, and having a series of parallel channels $2^c$, formed in the raised bottom surface 2, the bottom of said channel being in a plane with the bottom of the annular groove 3, and discharging into the said groove, the body portion having a drawing-off outlet in line with the bottom of the groove 3, all being arranged substantially as shown and for the purposes described.

2. As a new article of manufacture, a crock or jar for packing salted meats and the like, comprising a body portion having its upper end formed to receive a detachable closure member and having a flat bottom, said bottom having an annular brine-collecting channel at the point where it merges with the side walls of the body, said body having a series of raised portions 2, whose upper faces are flat and lie in the same horizontal plane, the peripheral edge of the uppermost one of said surfaces tapering or beveling toward the annular collecting-channel, the vertical edges of the raised portions 2, joined by the vertical edges and the flat surfaces being at a sharp angle, the raised portions 2, being disposed in registering transverse series whereby clearly-defined collecting-spaces $2^c$, are provided, and the body portion having a plugged drawing-off outlet 5, in the plane with the bottom of the channel 3, all being arranged substantially as shown and for the purposes described.

FREDK. W. PATTERSON.

Witnesses:
E. W. WERNER,
F. E. SMITH.